US012783719B2

(12) United States Patent
Dange et al.

(10) Patent No.: US 12,783,719 B2
(45) Date of Patent: *Nov. 3, 2026

(54) SYSTEM AND METHOD FOR MANAGING TOKENIZED PERSONALLY IDENTIFIABLE INFORMATION

(71) Applicant: Amod Ashok Dange, Mountain View, CA (US)

(72) Inventors: Amod Ashok Dange, Mountain View, CA (US); Yash Mody, Mumbai (IN)

(73) Assignee: Amod Ashok Dange, Mountain View, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 18/783,017

(22) Filed: Jul. 24, 2024

(65) Prior Publication Data

US 2024/0378318 A1 Nov. 14, 2024

Related U.S. Application Data

(63) Continuation-in-part of application No. 17/481,468, filed on Sep. 22, 2021, now Pat. No. 12,072,963, (Continued)

(51) Int. Cl.
*G06F 21/62* (2013.01)
*G06F 21/32* (2013.01)
(Continued)

(52) U.S. Cl.
CPC .......... *G06F 21/6245* (2013.01); *G06F 21/32* (2013.01); *H04L 9/0866* (2013.01); (Continued)

(58) Field of Classification Search
CPC ... G06F 21/6245; G06F 21/32; H04L 9/0866; H04L 9/3213; H04L 9/3231; (Continued)

(56) References Cited

U.S. PATENT DOCUMENTS 6,401,206 B1 * 6/2002 Khan .................... H04L 9/3247 713/176
7,013,290 B2 3/2006 Ananian
(Continued)

FOREIGN PATENT DOCUMENTS

JP 4675660 B2 10/2006
JP 2014127164 A 7/2014

OTHER PUBLICATIONS

Sy et al. "Generation of Cryptographic Keys from Personal Biometrics: An Illustration Based on Fingerprints." dated Nov. 28, 2021, pp. 1-35.
(Continued)

*Primary Examiner* — Cheng-Feng Huang

(57) ABSTRACT

A system and method for managing tokenized personally identifiable information. The system registers users as enterprise representatives, customers, and law enforcement agents on an authenticator application, capturing and encrypting their authenticated information from an External Identity System. For enterprise customers, data is tokenized and securely stored. Users are registered on respective applications. The system processes information disclosure requests through a law enforcement application, implementing a dual-signature approval process. Both the enterprise representative and law enforcement agent are authenticated using biometric data, their digital signatures are affixed to the request, and only then is relevant customer information decrypted. A comprehensive audit log is maintained throughout. This approach ensures secure data handling, facilitates lawful information disclosure, and maintains transparency and accountability, addressing challenges posed by Know Your Customer regulations and data protection laws.

18 Claims, 9 Drawing Sheets

Related U.S. Application Data which is a continuation-in-part of application No. 17/018,273, filed on Sep. 11, 2020, now Pat. No. 11,582,032.

(60) Provisional application No. 63/029,717, filed on May 26, 2020, provisional application No. 62/954,591, filed on Dec. 29, 2019, provisional application No. 62/906,080, filed on Sep. 25, 2019.

(51) Int. Cl.

*H04L 9/08* (2006.01)
*H04L 9/32* (2006.01)
*H04L 9/40* (2022.01)

(52) U.S. Cl.

CPC .......... *H04L 9/3213* (2013.01); *H04L 9/3231* (2013.01); *H04L 9/3247* (2013.01); *H04L 63/0823* (2013.01); *H04L 63/0861* (2013.01); *H04L 63/102* (2013.01)

(58) Field of Classification Search

CPC ............... H04L 9/3247; H04L 63/0823; H04L 63/0861; H04L 63/102

See application file for complete search history.

(56) References Cited

U.S. PATENT DOCUMENTS

| | | | | |
|---|---|---|---|---|
| 7,039,805 | B1 * | 5/2006 | Messing | G06F 21/32 713/176 |
| 7,093,131 | B1 * | 8/2006 | Kobayashi | H04L 9/3247 380/258 |
| 7,340,438 | B2 | 3/2008 | Nordman et al. | |
| 7,496,191 | B1 | 2/2009 | Crews et al. | |
| 7,769,633 | B2 | 8/2010 | Jokinen et al. | |
| 8,170,615 | B2 | 5/2012 | Vanska et al. | |
| 9,633,269 | B2 | 4/2017 | Gu et al. | |
| 10,136,191 | B1 | 11/2018 | Lewis et al. | |
| 10,489,826 | B2 | 11/2019 | Matthews et al. | |
| 10,530,577 | B1 | 1/2020 | Pazhoor et al. | |
| 11,252,479 | B2 | 2/2022 | Lewis et al. | |
| 2002/0023220 | A1 | 2/2002 | Kaplan | |
| 2003/0028451 | A1 | 2/2003 | Ananian | |
| 2003/0135740 | A1 * | 7/2003 | Talmor | H04L 9/3231 713/186 |
| 2006/0085844 | A1 * | 4/2006 | Buer | H04L 9/3263 726/4 |
| 2007/0271463 | A1 * | 11/2007 | Ginter | G06F 21/109 713/176 |
| 2008/0072068 | A1 | 3/2008 | Wang et al. | |
| 2009/0271634 | A1 | 10/2009 | Boult et al. | |
| 2012/0033807 | A1 * | 2/2012 | Asim | G06F 21/606 380/44 |
| 2014/0006290 | A1 * | 1/2014 | Hozanne | H04L 9/3231 705/75 |
| 2015/0006895 | A1 * | 1/2015 | Irvine | G06F 21/6209 713/171 |
| 2015/0046699 | A1 * | 2/2015 | Benteo | G06F 21/35 713/155 |
| 2015/0095999 | A1 * | 4/2015 | Toth | H04L 9/3263 726/6 |
| 2015/0134552 | A1 * | 5/2015 | Engels | G06Q 10/087 705/318 |
| 2015/0269389 | A1 * | 9/2015 | Lee | H04L 63/0428 726/5 |
| 2015/0280921 | A1 * | 10/2015 | Geoffrey | H04L 9/3247 713/176 |
| 2016/0050213 | A1 * | 2/2016 | Storr | H04L 9/32 726/6 |
| 2016/0219046 | A1 | 7/2016 | Ballard et al. | |
| 2017/0141920 | A1 * | 5/2017 | Herder, III | H04L 9/30 |
| 2017/0372059 | A1 | 12/2017 | Sindia et al. | |
| 2018/0173871 | A1 * | 6/2018 | Toth | H04W 12/126 |
| 2018/0307859 | A1 | 10/2018 | LaFever et al. | |
| 2019/0097812 | A1 * | 3/2019 | Toth | H04L 9/0841 |
| 2019/0182176 | A1 | 6/2019 | Niewczas | |
| 2019/0306151 | A1 | 10/2019 | Hamel et al. | |
| 2020/0204545 | A1 | 6/2020 | Pacella et al. | |
| 2020/0266989 | A1 | 8/2020 | KrcMaricic-Barackov et al. | |
| 2020/0296093 | A1 | 9/2020 | Hoyos | |
| 2021/0058246 | A1 * | 2/2021 | Stolbikov | H04L 9/0841 |
| 2021/0091937 | A1 | 3/2021 | Dange et al. | |
| 2022/0004613 | A1 | 1/2022 | Dange et al. | |
| 2022/0004619 | A1 | 1/2022 | Dange et al. | |
| 2022/0004661 | A1 | 1/2022 | Dange et al. | |
| 2022/0006815 | A1 | 1/2022 | Dange et al. | |
| 2022/0038921 | A1 | 2/2022 | Wu et al. | |

OTHER PUBLICATIONS

Hochrieser, "Online Dating Can Benefit From Identity Verification And Biometric Authentication In 2019", Information Security Buzz, dated Jul. 18, 2019 pp. 1-5.

Arsenova, "Face Liveness Detection For Safe Biometric Authentication And Face Recognition", dated Jan. 27, 2020, pp. 1-10.

M. Kapko et al., "What is Windows Hello? Microsoft's biometrics security system explained" dated Jan. 12, 2021, pp. 1-5.

Mjaaland et al., "Biocryptics: Towards Robust Biometric Public/Private Key Generation", The Norwegian Information Security Conference (NISK) dated 2009, pp. 27-42.

Chandra et al., "Generate an Encryption Key by using Biometric Cryptosystems to secure transferring of Data over a Network", IOSR Journal of Computer Engineering (IOSR-JCE), vol. 12, Issue 1, dated May-Jun. 2013), pp. 1-11.

Non-Final Office Action dated Nov. 12, 2025, issued in U.S. Appl. No. 18/782,801 (16 pages).

Notice of Allowance dated Jan. 8, 2026, issued in U.S. Appl. No. 18/782,801 (11 pages).

* cited by examiner

SYSTEM AND METHOD FOR MANAGING TOKENIZED PERSONALLY IDENTIFIABLE INFORMATION

CROSS-REFERENCE TO RELATED APPLICATIONS AND PRIORITY

The present application is a Continuation in Parts (CIP) application of U.S. Complete application Ser. No. 17/481,468, filed on Sep. 22, 2021 entitled "System and method for affixing a signature using biometric authentication", which claims priority from US Complete application Ser. No. 17/018,273 filed on Sep. 11, 2020 entitled "System and method for sharing user preferences without having the user reveal their identity", which claims priority from U.S. Provisional Application No. 62/906,080 filed on Sep. 25, 2019 entitled "Method and system of managing personal and business information", the U.S. Provisional Application No. 62/954,591 filed on Dec. 29, 2019 entitled "Method and system for anonymously matching consumers and businesses", and also claims priority from U.S. Provisional Application No. 63/029,717 filed on May 26, 2020 entitled "Method and system of storing identity and signature using the human body as a node."

TECHNICAL FIELD

The present subject matter described herein, in general, relates to a system and a method for data management. More specifically, the present subject matter discloses the system and method for managing tokenized personally identifiable information.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

In today's digital age, businesses face the increasingly complex challenge of balancing regulatory compliance with individual privacy protection. This challenge is primarily driven by two opposing forces: Know Your Customer (KYC) regulations and data protection laws such as the EU's General Data Protection Regulation (GDPR), the California Consumer Privacy Act (CCPA), and the Digital Personal Data Protection (DPDP) Act in India.

KYC guidelines and regulations in the United States mandate that financial service professionals verify the identity, suitability, and risks of maintaining business relationships with customers. These regulations are part of a wider effort to combat money laundering and terrorism financing. Originally focused on financial institutions, KYC requirements now extend to various sectors, including fintech, virtual asset dealers, and non-profits. Under the Financial Industry Regulatory Authority (FINRA) Rule 2090, financial institutions must diligently identify and retain every customer's identity and those acting on their behalf, gathering all necessary information through Customer Identification Programs (CIP), Customer Due Diligence (CDD), and Enhanced Due Diligence (EDD).

The CIP, mandated by the USA Patriot Act Section 326, requires banks to collect names, dates of birth, addresses, and identification numbers. The CDD, established under the Bank Secrecy Act, aims to improve financial transparency and prevent money laundering by identifying customers and beneficial owners, understanding customer relationships, and conducting ongoing monitoring. Enhanced Due Diligence is applied when higher risk factors are identified, including checks on the source of wealth and funds, additional identity verification, and risk assessment.

The KYC process has evolved to include Know Your Customer's Customer (KYCC) and Know Your Business (KYB) to further mitigate risks of fraud and money laundering by verifying the customers of a customer and the legitimacy of business entities, respectively. Electronic KYC (cKYC) has emerged, leveraging digital means for identity verification, enhancing efficiency and accuracy. Internationally, KYC laws vary, with countries like Australia, Canada, India, and the UK having their own regulations to monitor financial transactions and ensure compliance with AML and KYC standards.

On the other side of the spectrum, data protection regulations like GDPR, CCPA, and the DPDP Act emphasize the protection of personal data and individual privacy rights. The GDPR, a comprehensive data protection law in the European Union, sets a high standard for global privacy rights and compliance. It applies to all organizations operating within the EU and those outside the EU that offer goods or services to, or monitor the behavior of, EU data subjects. The GDPR emphasizes transparency, security, and accountability by data controllers and processors, granting individuals a range of rights over their data, including access, correction, deletion, and the right to object to data processing.

The CCPA, effective from January 2020, is the United States' most comprehensive state privacy law, focused on enhancing privacy rights and consumer protection for residents of California. It grants Californians the right to know about the personal information collected about them, the purpose of its collection, and to whom it is disclosed. The CCPA also provides rights to request the deletion of personal information, to opt out of its sale, and protection against discrimination for exercising these rights.

India's DPDP Act of 2023 aims to regulate the processing of digital personal data while balancing individuals' rights to privacy with the necessity for lawful data processing. It establishes obligations for data fiduciaries and rights for data principals, introduces financial penalties for violations, and creates the Data Protection Board of India for adjudication.

This regulatory landscape creates a paradox for businesses. On the one hand, KYC regulations require businesses to collect detailed personal information from customers. On the other hand, privacy laws mandate strict controls over personal data collection, processing, and storage. This paradox is further complicated by the ever-present threat of cyberattacks, which necessitates robust data security measures.

The conflict between KYC and privacy regulations presents significant operational challenges for businesses. They must collect and retain vast amounts of personal data to comply with KYC while simultaneously ensuring that this data is collected, processed, and secured under the strict conditions set by privacy laws. This delicate balancing act is both a technical challenge and a legal and ethical one, requiring businesses to navigate differing and sometimes conflicting regulatory environments.

Furthermore, the need to invest in advanced cybersecurity and data management solutions, foster a culture of privacy and security awareness among employees, and stay abreast of legal developments in privacy and data protection laws across jurisdictions adds to the operational burden on businesses. Non-compliance can result in significant financial penalties, reputational damage, and loss of customer trust.

This complex regulatory environment raises the barrier to entry for businesses, increases the cost of doing business, and ultimately results in higher prices of goods and services for consumers. The challenge lies in finding a solution that allows businesses to fulfill their KYC obligations while also complying with stringent data protection regulations and maintaining robust cybersecurity measures.

There is a clear need for an innovative approach that can reconcile these opposing forces, enabling businesses to meet their regulatory obligations while upholding the fundamental right to privacy and protecting sensitive customer data from unauthorized access. Such a solution would not only ease the burden on businesses but also enhance consumer protection and trust in the digital economy. The present invention addresses this need by offering a method of tokenizing sensitive customer data, making it easier for businesses to handle without the fear of unauthorized access while providing a secure way for courts and law enforcement to access it when legally permissible.

SUMMARY

This summary is provided to introduce concepts related to a system and a method for managing tokenized personally identifiable information, which are further described below in the detailed description. This summary is not intended to identify essential features of the claimed subject matter nor is it intended for use in determining or limiting the scope of the claimed subject matter.

In one implementation, a system for managing tokenized personally identifiable information is illustrated. The system comprises a processor and a memory coupled to the processor. The processor is configured to execute program instructions stored in the memory for registering users on an authenticator application based on a user registration process, including a first user as an enterprise representative, a second user as an enterprise customer, and a third user as a law enforcement agent. For each registered user, the processor captures authenticated personal identification information from an External Identity System, encrypts the authenticated personal identification information, and stores the encrypted personal identification information on the user's device.

For the second user (enterprise customer), the processor executes additional steps to tokenize the personal identification information. The tokenization process involves storing the encrypted personal identification information in an enterprise database, dividing the encrypted information into data packets, assigning unique identifiers to each packet, storing the data packets and unique identifiers in the enterprise database, generating a master token linking all unique identifiers corresponding to the second user, and storing the master token in the enterprise database.

The processor then registers users on respective applications, wherein the first user is registered on an enterprise application as the enterprise representative, the second user is registered on the enterprise application as the enterprise customer, and the third user is registered on a law enforcement application as the law enforcement agent.

To process an information disclosure request, the processor receives the request through the law enforcement application, either with a transaction identifier (if the law enforcement agent has not identified the enterprise customer under investigation) or a tokenized enterprise customer identifier (if the law enforcement agent has identified the enterprise customer under investigation). The processor authenticates the law enforcement agent's identity, identifies a target tokenized enterprise customer and a target enterprise representative corresponding to the transaction identifier listed in the information disclosure request, and transmits the information disclosure request to the target enterprise representative.

The processor then authenticates the target enterprise representative's identity, affixes the target enterprise representative's biometrically authenticated digital signature as a first signature to the information disclosure request, transmits the signed information disclosure request back to the law enforcement agent along with a second signature request, and affixes the law enforcement agent's biometrically authenticated digital signature as a second signature to the information disclosure request. Finally, the processor decrypts the relevant encrypted enterprise customer identification information. Throughout the entire process, the system maintains an audit log of all information disclosure requests, including the first signature and the second signature.

In another implementation, a method for managing tokenized personally identifiable information is illustrated. The method comprises registering users on an authenticator application based on a user registration process, including registering a first user as an enterprise representative, a second user as an enterprise customer, and a third user as a law enforcement agent. For each registered user, the method involves capturing authenticated personal identification information from an External Identity System, encrypting the authenticated personal identification information, and storing the encrypted personal identification information on the user's device.

For the second user (enterprise customer), the method includes additional steps for tokenizing the personal identification information. The tokenization process involves storing the encrypted personal identification information in an enterprise database, dividing the encrypted information into data packets, assigning unique identifiers to each packet, storing the data packets and unique identifiers in the enterprise database, generating a master token linking all unique identifiers corresponding to the second user, and storing the master token in the enterprise database.

The method then proceeds to register users on respective applications, wherein the first user is registered on an enterprise application as the enterprise representative, the second user is registered on the enterprise application as the enterprise customer, and the third user is registered on a law enforcement application as the law enforcement agent.

For processing an information disclosure request, the method includes receiving the request through the law enforcement application, either with a transaction identifier or a tokenized enterprise customer identifier. The method authenticates the law enforcement agent's identity, identifies a target tokenized enterprise customer and a target enterprise representative corresponding to the transaction identifier listed in the information disclosure request, and transmits the information disclosure request to the target enterprise representative.

The method then authenticates the target enterprise representative's identity, affixes the target enterprise representative's biometrically authenticated digital signature as a first signature to the information disclosure request, transmits the signed information disclosure request back to the law enforcement agent along with a second signature request, and affixes the law enforcement agent's biometrically authenticated digital signature as a second signature to the information disclosure request. Finally, the method includes decrypting the relevant encrypted enterprise customer identification information. Throughout the entire process, the method maintains an audit log of all information disclosure requests, including the first signature and the second signature.

In yet another implementation, a non-transitory computer-readable storage medium storing computer program instructions for managing tokenized personally identifiable information is illustrated. When executed by a processor, these instructions cause the processor to perform operations comprising registering users on an authenticator application based on a user registration process, including registering a first user as an enterprise representative, a second user as an enterprise customer, and a third user as a law enforcement agent. For each registered user, the operations involve capturing authenticated personal identification information from an External Identity System, encrypting the authenticated personal identification information, and storing the encrypted personal identification information on the user's device.

For the second user (enterprise customer), the operations include additional steps for tokenizing the personal identification information. The tokenization process involves storing the encrypted personal identification information in an enterprise database, dividing the encrypted information into data packets, assigning unique identifiers to each packet, storing the data packets and unique identifiers in the enterprise database, generating a master token linking all unique identifiers corresponding to the second user, and storing the master token in the enterprise database.

The operations then proceed to register users on respective applications, wherein the first user is registered on an enterprise application as the enterprise representative, the second user is registered on the enterprise application as the enterprise customer, and the third user is registered on a law enforcement application as the law enforcement agent.

For processing an information disclosure request, the operations include receiving the request through the law enforcement application, either with a transaction identifier or a tokenized enterprise customer identifier. The operations authenticate the law enforcement agent's identity, identify a target tokenized enterprise customer and a target enterprise representative corresponding to the transaction identifier listed in the information disclosure request, and transmit the information disclosure request to the target enterprise representative.

The operations then authenticate the target enterprise representative's identity, affix the target enterprise representative's biometrically authenticated digital signature as a first signature to the information disclosure request, transmit the signed information disclosure request back to the law enforcement agent along with a second signature request, and affix the law enforcement agent's biometrically authenticated digital signature as a second signature to the information disclosure request. Finally, the operations include decrypting the relevant encrypted enterprise customer identification information. Throughout the entire process, the operations maintain an audit log of all information disclosure requests, including the first signature and the second signature.

BRIEF DESCRIPTION OF DRAWINGS

The detailed description is described with reference to the accompanying Figures. The same numbers are used throughout the drawings to refer to features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
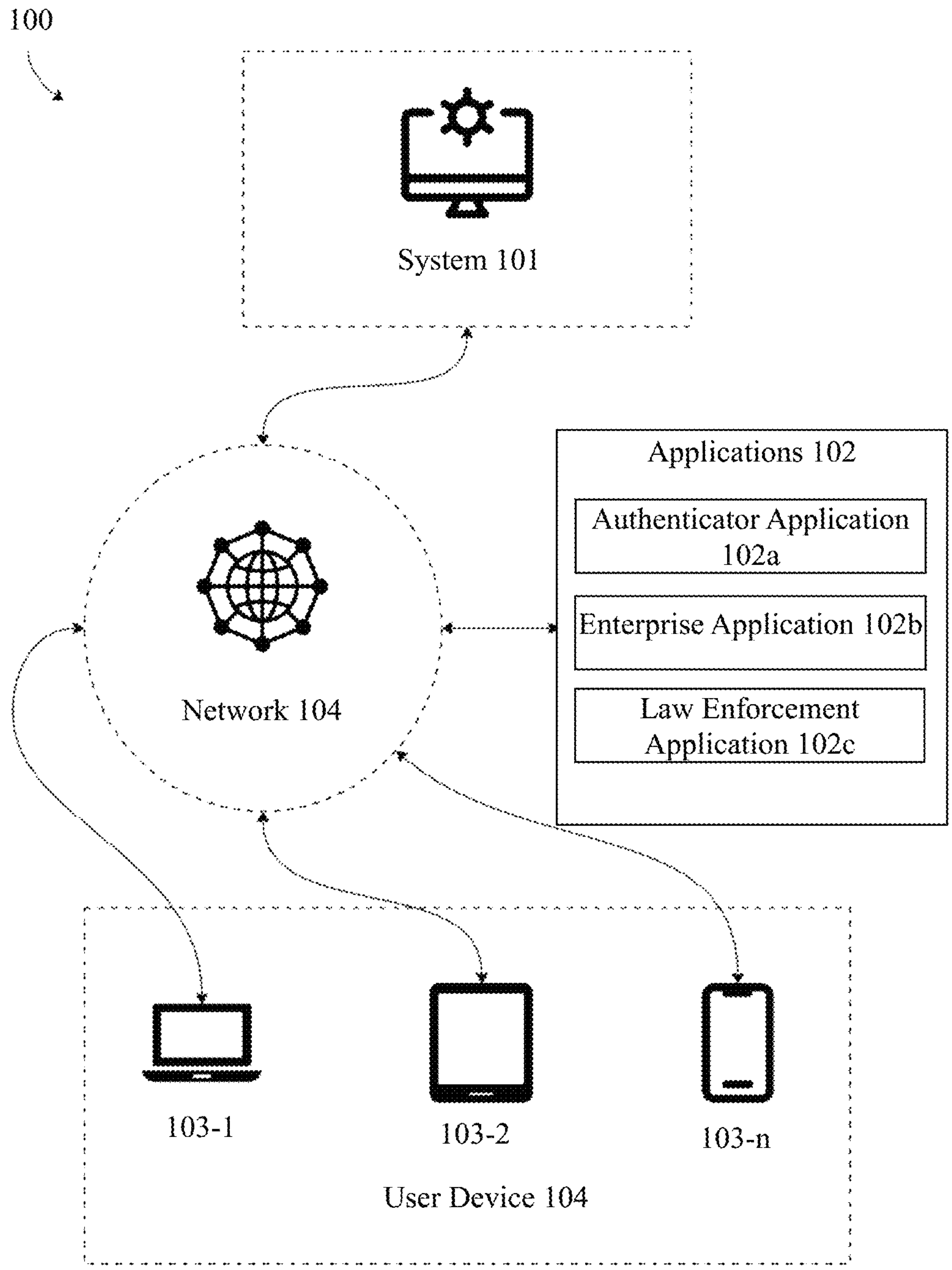
FIG. 1 illustrates a network implementation 100 of a system 101 for managing tokenized personally identifiable information, in accordance with an embodiment of the present disclosure.

Referring to FIG. 1, implementation 100 of system 101 for managing tokenized personally identifiable information is illustrated, in accordance with an embodiment of the present subject matter. In one embodiment, the system 101 may comprise a processor and a memory. Further, the system 101 may be connected to user devices and Applications through a network 104. It may be understood that the system 101 may be communicatively coupled with multiple users through one or more User devices 103-1, 103-2, 103-3 . . . , **103-*n* and Applications 102-*a*, 102-*b*, 102-*c* . . . , 102-*n* collectively referred to as a user device 103 and Applications 102. The Applications 102 may at least include an Authenticator Application 102*a*, an Enterprise Application 102*b*, and a Law Enforcement Application 102*c***.

In one embodiment, the network 104 may be a cellular communication network used by user devices 103 such as mobile phones, tablets, or a virtual device. In one embodiment, the cellular communication network may be the Internet. The user device 103 may be any electronic device, communication device, image capturing device, machine, software, automated computer program, a robot or a combination thereof. Further the Application 102 may be any networking platform, media platform, messaging platform, ecommerce platform, or any other application platform. The system 101 may be configured to register users over the system 101. Further, the system 101 may be configured to authenticate the user, each time the user makes a request to access the system 101.

In one embodiment, the user devices 103 may support communication over one or more types of networks in accordance with the described embodiments. For example, some user devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. The aforementioned user devices 103 and network 104 may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others.

In one embodiment, the user devices 103 are enabled with biometric scanning capabilities, which are crucial for the biometric authentication processes central to the system's operation. The Application 102 requires user authentication before providing the user with access to the application. The user registration process is further illustrated with the block diagram in FIG. 2. Further, the system 101 manages the registration of users, the encryption and tokenization of personally identifiable information, and the secure processing of information disclosure requests. The user registration process is further illustrated with the block diagram in FIG. 2.

Figure 2:
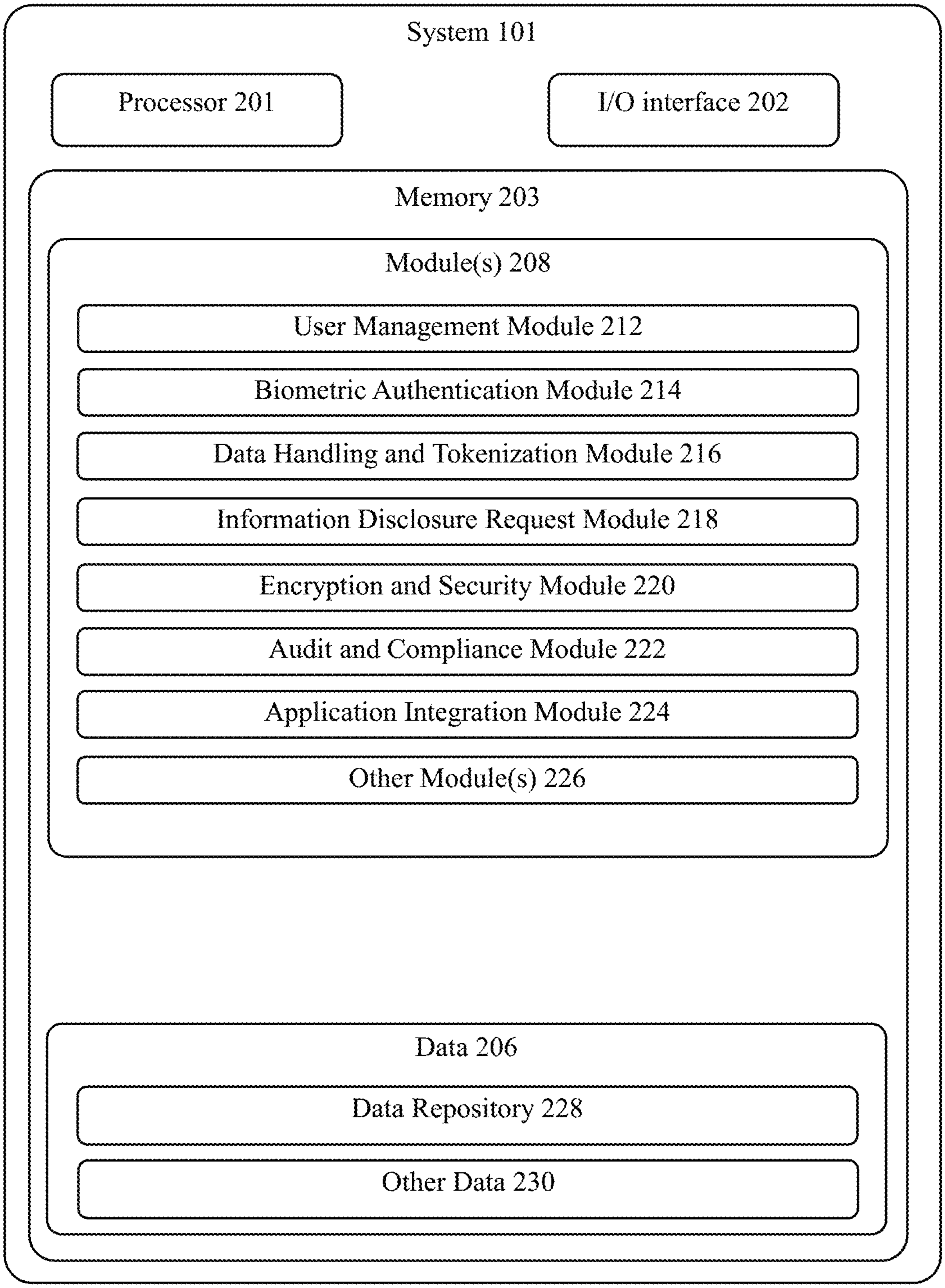
FIG. 2 illustrates components of the system 101 for managing tokenized personally identifiable information, in accordance with an embodiment of the present disclosure.

Referring now to FIG. 2, various components of the system 101 are illustrated, in accordance with an embodiment of the present subject matter. As shown, the system 101 may include at least one processor 201, I/O interface 202 and a memory 203. The memory consists of a set of modules 208. The set of modules 208 may include a User Management Module 212, a Biometric Authentication Module 214, a Data Handling and Tokenization Module 216, an Information Disclosure Request Module 218, an Encryption and Security Module 220, an Audit and Compliance Module 222, an Application Integration Module 224, and Other Module(s) 226. In one embodiment, the at least one processor 201 is configured to fetch and execute computer-readable instructions, stored in the memory 203, corresponding to each module.

In one embodiment, the memory 203 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and memory cards.

In one embodiment, the programmed instructions may include routines, programs, objects, components, data structures, etc., which perform particular tasks, functions, or implement particular abstract data types. The data 206 may comprise a data repository 228, and other data 230. The other data 230 amongst other things, serves as a repository for storing data processed, received, and generated by one or more components and programmed instructions. The working of the system 101 will now be described in detail referring to FIGS. 1 and 2.

In one embodiment, the processor 201 may be configured for executing programmed instructions corresponding to the User Management Module 212 for handling the registration of three distinct types of users, namely enterprise representatives, enterprise customers, and law enforcement agents. The User Management Module 212 is configured to register each user based on a user registration process.

For each user registration, the User Management Module 212 first interacts with an External Identity System to capture authenticated personal identification information. For instance, when John Doe, an enterprise customer, requests registration, the User Management Module 212 establishes a secure connection with a government database serving as the External Identity System. John Doe's credentials, such as his passport number, are securely transmitted to the system 101. In response, the External Identity System provides encrypted and authenticated personal identity information about John Doe.

Upon receiving this information, the User Management Module 212 may implement industry-standard encryption algorithms, such as AES-256, to further encrypt the authenticated personal identification information. This additional layer of encryption ensures protection of sensitive data. The resulting encrypted information is then securely stored on the user's personal device, be it John Doe's smartphone or personal computer.

For enterprise representatives, like Jane Roe from ACME Corporation, the User Management Module 212 performs an additional verification step. The User Management Module 212 checks that the email address provided by Jane Roe is associated with the official domain name owned by ACME Corporation. This verification ensures that only authorized individuals can represent the enterprise within the system 101.

In an embodiment, the Biometric Authentication Module 214 is responsible for processing biometric samples, generating and managing cryptographic keys, and authenticating users based on biometric data and cryptographic keys. When a user, such as John Doe, an enterprise customer, or Jane Roe, an enterprise representative, attempts to access the system 101 or perform a sensitive operation, the Biometric Authentication Module 214 initiates the authentication process.

The process begins with the Biometric Authentication Module 214 receiving a set of biometric samples from the user. These biometric samples include but are not limited to facial scans, voice recordings, retinal scans, or palm vein patterns. For instance, John Doe might provide a facial scan using his smartphone's front camera.

Upon receiving the biometric samples, the Biometric Authentication Module 214 processes these samples to compute a Secret-Key (S1) corresponding to the user. This computation involves analyzing unique characteristics of the biometric samples that can be consistently reproduced each time the user provides their biometrics. For example, the unique facial features in John Doe's facial scan are processed to generate his Secret-Key (S1).

Next, the Biometric Authentication Module 214 generates a Unique-Number (N1) using a random number generation algorithm. This Unique-Number (N1) is a one-time generated random number that adds an additional layer of security to the authentication process.

The Biometric Authentication Module 214 then applies a Function (F1) to the Secret-Key (S1) and the Unique-Number (N1) to compute a Public-Key (P1). This Function (F1) is based on Asymmetric Key Encryption, which uses the Secret-Key (S1) and the Unique-Number (N1) as inputs to produce the Public-Key (P1). For instance, using John Doe's Secret-Key (S1) derived from his facial scan and the Unique-Number (N1), the Biometric Authentication Module 214 computes his unique Public-Key (P1).

The Biometric Authentication Module 214 then stores the Unique-Number (N1) on John Doe's user device and in a secure data repository within the system 101. The Public-Key (P1) is stored on a separate storage device. Importantly, the Secret-Key (S1) is never stored. The Secret-Key (S1) is computed in real-time during each authentication attempt.

For subsequent authentication attempts, the Biometric Authentication Module 214 follows a specific process. When John Doe attempts to access the system 101, the Biometric Authentication Module 214 receives a real-time biometric sample from him. The Biometric Authentication Module 214 processes this sample to generate a new Secret-Key (S2). The Biometric Authentication Module 214 then fetches the Public-Key (P1) corresponding to John Doe from his user device.

Using the Public-Key (P1), the newly generated Secret-Key (S2), and the Function (F1), the Biometric Authentication Module 214 computes a Real-Time-Unique-Number (N2). The Biometric Authentication Module 214 then compares this Real-Time-Unique-Number (N2) with the stored Unique-Number (N1). If these numbers match, John Doe is successfully authenticated. If they don't match, the authentication fails.

In one embodiment, the Data Handling and Tokenization Module 216 is a vital component of the system 101, responsible for capturing and encrypting personal identification information, storing and tokenizing information for enterprise customers, and managing tokenized data packets and master tokens.

When an enterprise customer, such as John Doe, has been registered and authenticated, the Data Handling and Tokenization Module 216 captures authenticated personal identification information from the External Identity System. This information, which has already been verified by the External Identity System, includes details such as John Doe's full name, date of birth, social security number, and address.

Upon receiving this authenticated information, the Data Handling and Tokenization Module 216 employs advanced encryption techniques to secure the data. Once encrypted, the Data Handling and Tokenization Module 216 stores this information in two locations. First, it stores the encrypted personal identification information on John Doe's user device, such as his smartphone or personal computer. This local storage allows for quick access during authentication processes. Secondly, the module stores the encrypted information in the enterprise database, which serves as a centralized and secure repository for all customer data.

The next step performed by the Data Handling and Tokenization Module 216 is the tokenization of the personal identification information. This process begins with the module dividing the encrypted information into smaller data packets. For example, John Doe's encrypted information might be divided into separate packets for his name, address, date of birth, and social security number.

The Data Handling and Tokenization Module 216 then assigns a unique identifier to each of these data packets. For instance, the packet containing John Doe's encrypted name might be assigned the identifier "JD001", his address "JD002", and so on. These data packets and their corresponding unique identifiers are then stored in the enterprise database.

To link all these separate data packets together, the Data Handling and Tokenization Module 216 generates a master token. This master token serves as a reference point for all the unique identifiers corresponding to John Doe's information. For example, John Doe's master token might be "MT_JD_2023", which links to all his data packet identifiers (JD001, JD002, etc.).

The Data Handling and Tokenization Module 216 stores this master token in the enterprise database, creating a secure and efficient system for managing John Doe's personal information. This tokenization process ensures that even if unauthorized access to the database occurs, the information remains fragmented and encrypted, providing an additional layer of security.

The Information Disclosure Request Module 218 is a critical component of the system 101, responsible for processing information disclosure requests from law enforcement, managing the approval workflow between law enforcement and enterprise representatives, and generating and verifying biometrically authenticated digital signatures.

The process begins when a law enforcement agent, such as Agent Smith, submits an information disclosure request through the law enforcement application. The Information Disclosure Request Module 218 can receive this request in two ways. In the first way, with a corresponding transaction identifier, if Agent Smith has not identified the specific enterprise customer under investigation. For example, Agent Smith might provide a transaction ID "TX20230715001" related to a suspicious financial transaction.

In the second way, with a corresponding tokenized enterprise customer identifier, if Agent Smith has already identified the enterprise customer under investigation. For instance, Agent Smith might provide the identifier "EC_JD_2023" corresponding to John Doc.

Upon receiving the request, the Information Disclosure Request Module 218 first authenticates Agent Smith's identity. This authentication is performed in conjunction with the Biometric Authentication Module 214, using the user authentication process described earlier. Agent Smith might provide a facial scan, which is then verified against the stored biometric information.

Once Agent Smith is authenticated, the Information Disclosure Request Module 218 proceeds to identify the target tokenized enterprise customer and the target enterprise representative corresponding to the provided identifier. If a transaction identifier was provided, the Information Disclosure Request Module 218 works with the Data Handling and Tokenization Module 216 to identify the relevant data packets based on the transaction details. If a customer identifier was provided, the module retrieves the associated master token and data packet identifiers.

For example, if the transaction identifier "TX20230715001" is linked to John Doe's account, the Information Disclosure Request Module 218 would identify John Doe as the target enterprise customer and retrieve his master token "MT_JD_2023". The Information Disclosure Request Module 218 then identifies the appropriate enterprise representative to handle the request. This might be Jane Roc, an authorized representative of ACME Corporation, the enterprise holding John Doe's information. Next, the Information Disclosure Request Module 218 transmits the information disclosure request to Jane Roc. The Information Disclosure Request Module 218 then initiates the authentication process for Jane Roc, again working with the Biometric Authentication Module 214 to verify her identity using biometric data.

Upon successful authentication, the Information Disclosure Request Module 218 displays the information disclosure request to Jane Roc. The module captures Jane Roc's approval to sign the information disclosure request and then affixes her biometrically authenticated digital signature as the first signature to the request. This signature is generated using Jane Roc's most recent biometric scan and cryptographic keys, ensuring non-repudiation. The Information Disclosure Request Module 218 then transmits the signed information disclosure request back to Agent Smith, along with a request for a second signature. The module once again authenticates Agent Smith using the biometric authentication process.

After successful authentication, the Information Disclosure Request Module 218 displays the information disclosure request, now bearing Jane Roc's signature, to Agent Smith. The module captures Agent Smith's approval to countersign the request and affixes his biometrically authenticated digital signature as the second signature to the request. With both signatures in place, the Information Disclosure Request Module 218 generates a unique identifier for this specific information disclosure request, such as "IDR_20230715_001". This identifier is used to link all actions related to this request in the audit log.

Finally, the Information Disclosure Request Module 218 works with the Encryption and Security Module 220 to decrypt the relevant encrypted enterprise customer identification information. The decrypted information is then made available to Agent Smith through the law enforcement application, strictly adhering to the scope defined in the approved information disclosure request.

The Encryption and Security Module 220 is a fundamental component of the system 101, responsible for handling encryption and decryption of sensitive information, implementing and managing overall system security, and interfacing with External Identity Systems for user information verification.

When the system 101 needs to interact with an External Identity System, such as a government database, to verify user information, the Encryption and Security Module 220 takes charge of the process. First, the module establishes a secure connection with the External Identity System. This connection is typically set up using industry-standard protocols such as Transport Layer Security (TLS), ensuring that all data transmitted between the system 101 and the External Identity System is encrypted and protected from interception.

Once the secure connection is established, the Encryption and Security Module 220 verifies the authenticity of the External Identity System. This verification process might involve checking digital certificates or using other authentication mechanisms to ensure that the External Identity System is legitimate and not an impersonator. For example, if connecting to a government database, the module might verify a specific government-issued digital certificate.

After verification, the Encryption and Security Module 220 sends encrypted user credentials to the External Identity System. For instance, if verifying John Doe's identity, the Encryption and Security Module 220 may send an encrypted version of his passport number or social security number. The encryption used for this transmission is separate from the encryption used for storing data within the system 101, adding an extra layer of security.

The Encryption and Security Module 220 also manages the enterprise database, ensuring that it stores only encrypted information and associated tokens. Crucially, there is no ability to decrypt this information without the law enforcement agent's private key. This means that even if an unauthorized party were to gain access to the enterprise database, they would only see encrypted data, which would be meaningless without the proper decryption keys.

Throughout all these processes, the Encryption and Security Module 220 employs industry-standard encryption algorithms. For symmetric encryption, it uses advanced algorithms like AES-256. For asymmetric encryption, it employs robust algorithms such as RSA-4096. These high-grade encryption methods ensure that the system 101 maintains the highest level of data protection, safeguarding sensitive personal information from unauthorized access or breaches.

In one embodiment, the Audit and Compliance Module 222 is a crucial component of the system 101, responsible for maintaining comprehensive audit logs of all system activities, managing data retention policies, handling data deletion requests, and notifying users of information disclosures.

The primary function of the Audit and Compliance Module 222 is to maintain a detailed audit log of all information disclosure requests, including both the first and second signatures. When an information disclosure request is initiated, such as Agent Smith requesting information about John Doe, the Audit and Compliance Module 222 begins recording every step of the process.

The Audit and Compliance Module 222 generates a unique identifier for each information disclosure request. For example, if Agent Smith initiates a request about John Doe on Jul. 15, 2023, the module might generate the identifier "IDR-20230715-001". This identifier serves as a reference point for all actions related to this specific request.

As the request progresses, the Audit and Compliance Module 222 may record timestamps for each step of the process in the audit log. For instance:

10:15:23 AM: Request "IDR-20230715-001" received from Agent Smith

10:15:45 AM: Request transmitted to Jane Roe (ACME Corporation representative) for approval 10:25:30 AM: Jane Roe's biometric authentication initiated 10:25:32 AM: Jane Roe's signature affixed to the request 10:30:05 AM: Signed request sent back to Agent Smith 10:32:20 AM: Agent Smith's biometric authentication initiated 10:32:22 AM: Agent Smith's countersignature affixed to the request 10:35:10 AM: Relevant information decrypted and disclosed to Agent Smith The Audit and Compliance Module 222 stores the biometrically authenticated digital signatures for both the target enterprise representative (Jane Roe) and the law enforcement agent (Agent Smith) in the audit log. These signatures are cryptographic proofs of their approval and cannot be repudiated later.

In addition to logging information disclosure requests, the Audit and Compliance Module 222 also records details of all other significant system activities. This includes user registrations, data updates, and any access to or modification of stored data.

In an embodiment, the Audit and Compliance Module 222 is responsible for notifying users when their information has been subject to a disclosure request, where legally required and permissible. However, the notifications may not be sent to John Doe in case of criminal or fraudulent case investigations. In John Doe's case, once his information has been disclosed to Agent Smith, the Audit and Compliance Module 222 may optionally generate a notification to John per legal requirement.

Furthermore, the Audit and Compliance Module 222 provides users with a log of what part of their information has been disclosed, to whom, when, and on what legal basis. John could access this log through a secure portal, seeing entries like:

Jul. 15, 2023: Address disclosed to Local Police Department, Case #12345, based on court order #67890

This comprehensive approach to auditing and compliance ensures transparency, accountability, and adherence to data protection regulations, while also empowering users with knowledge about how their data is being used and shared.

In an embodiment, the Application Integration Module 224 is responsible for managing the registration of users on respective applications and handling interactions between the core system and external applications. This module ensures seamless integration and secure communication between the system 101 and various external applications used by different user types.

The primary function of the Application Integration Module 224 is to register users on their respective applications. The Application Integration Module 224 handles three types of user registrations. For the first user type, such as Jane Roe, the Application Integration Module 224 registers the user on an enterprise application as an enterprise representative. For example, when Jane Roe is registered as a representative of ACME Corporation, the Application Integration Module 224 may create a secure account for her on ACME's internal management system. This account is configured with appropriate access rights and permissions based on Jane's role within the organization.

For the second user type, such as John Doe, the Application Integration Module 224 registers the user on the enterprise application as an enterprise customer. In John's case, the module might create a customer account for him in ACME Corporation's customer relationship management (CRM) system. This account is then linked to John's tokenized data in the secure database managed by the Data Handling and Tokenization Module 216. For the third user type, such as Agent Smith, the Application Integration Module 224 registers the user as a law enforcement agent on a separate law enforcement application. This application is specifically designed to handle sensitive requests and maintain the necessary security protocols for law enforcement activities.

In each of these registration processes, the Application Integration Module 224 ensures that the user's credentials and access rights are properly configured in the respective applications. It also establishes secure channels for data exchange between these external applications and the core system 101.

Another crucial function of the Application Integration Module 224 is managing interactions between the core system 101 and external applications. For instance, when Agent Smith initiates an information disclosure request through the law enforcement application, the Application Integration Module 224 acts as a secure bridge. It ensures that the request is properly formatted, encrypted, and transmitted to the core system 101 for processing. The Application Integration Module 224 handles the flow of information in both directions. When the core system 101 needs to send data back to the law enforcement application, such as the decrypted information requested by Agent Smith, the Application Integration Module 224 ensures that only authorized data is transferred and that all security protocols are followed.

Similarly, when John Doe updates his personal information through ACME Corporation's customer portal, the Application Integration Module 224 ensures that this update is securely transmitted to the core system 101. Once received, the updated information is processed by the Data Handling and Tokenization Module 216, where it is encrypted, tokenized, and stored according to the established protocols. The Application Integration Module 224 also maintains detailed logs of all interactions between the core system 101 and external applications. These logs are then passed to the Audit and Compliance Module 222 for comprehensive record-keeping and compliance monitoring.

Figure 3:
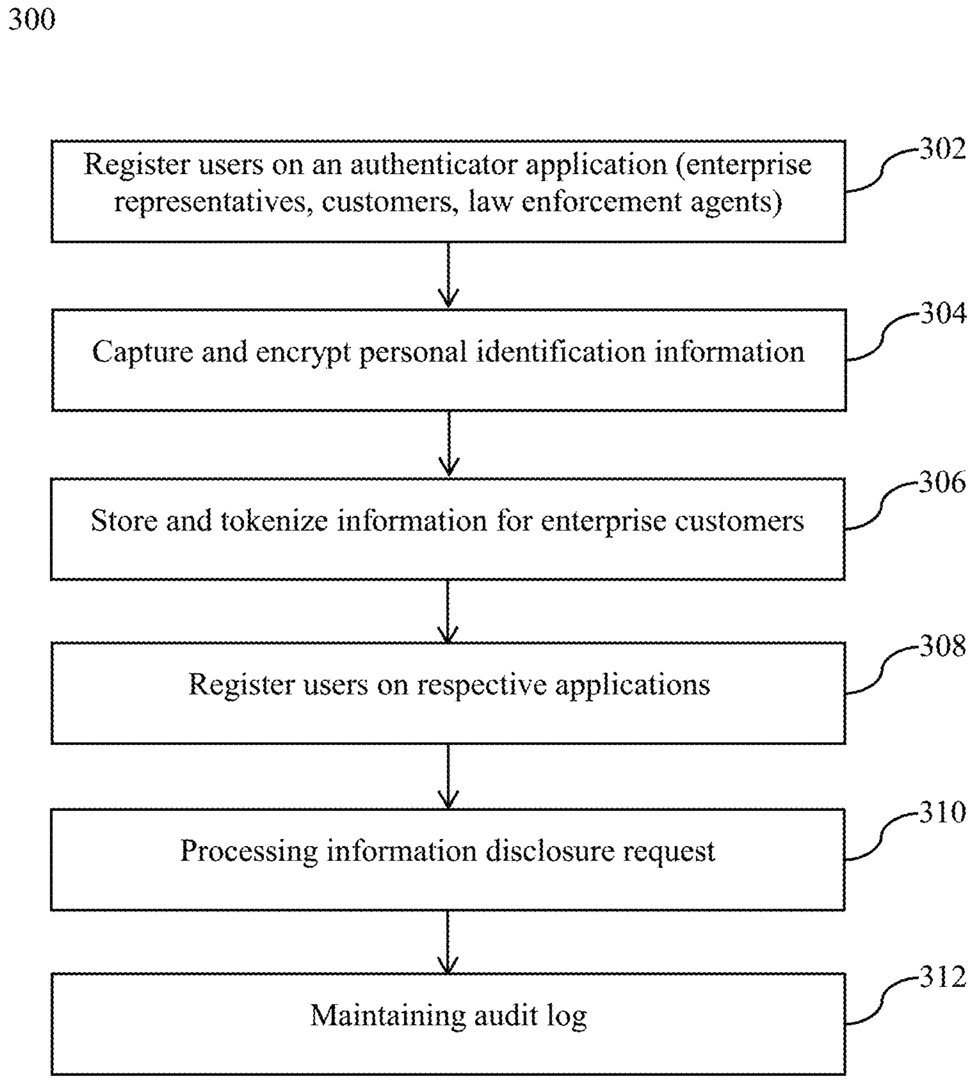
FIG. 3 illustrates a method 300 for managing tokenized personally identifiable information, in accordance with an embodiment of the present disclosure.

FIG. 3 illustrates a method 300 for managing tokenized personally identifiable information, in accordance with an embodiment of the present disclosure.

At step 302, the method involves registering users on an authenticator application based on a user registration process. This includes registering a first user as an enterprise representative, a second user as an enterprise customer, and a third user as a law enforcement agent.

At step 304, the method involves capturing and encrypting personal identification information. For each registered user, this step includes capturing authenticated personal identification information from an External Identity System, encrypting the authenticated personal identification information, and storing the encrypted personal identification information on the user's device.

At step 306, the method involves storing and tokenizing information for enterprise customers. Specifically for the second user (enterprise customer), this step includes storing the encrypted personal identification information in an enterprise database, and tokenizing the personal identification information. The tokenization process involves dividing the encrypted information into data packets, assigning a unique identifier to each packet, storing the data packets and the unique identifiers in the enterprise database, generating a master token linking all the unique identifiers corresponding to the second user, and storing the master token in the enterprise database.

At step 308, the method involves registering users on respective applications. This includes registering the first user on an enterprise application as an enterprise representative, registering the second user on the enterprise application as an enterprise customer, and registering the third user as a law enforcement agent on a law enforcement application.

At step 310, the method involves processing an information disclosure request. This step is detailed further in FIG. 4.

At step 312, the method involves maintaining an audit log of all information disclosure requests along with the first signature and the second signature.

Figure 4:
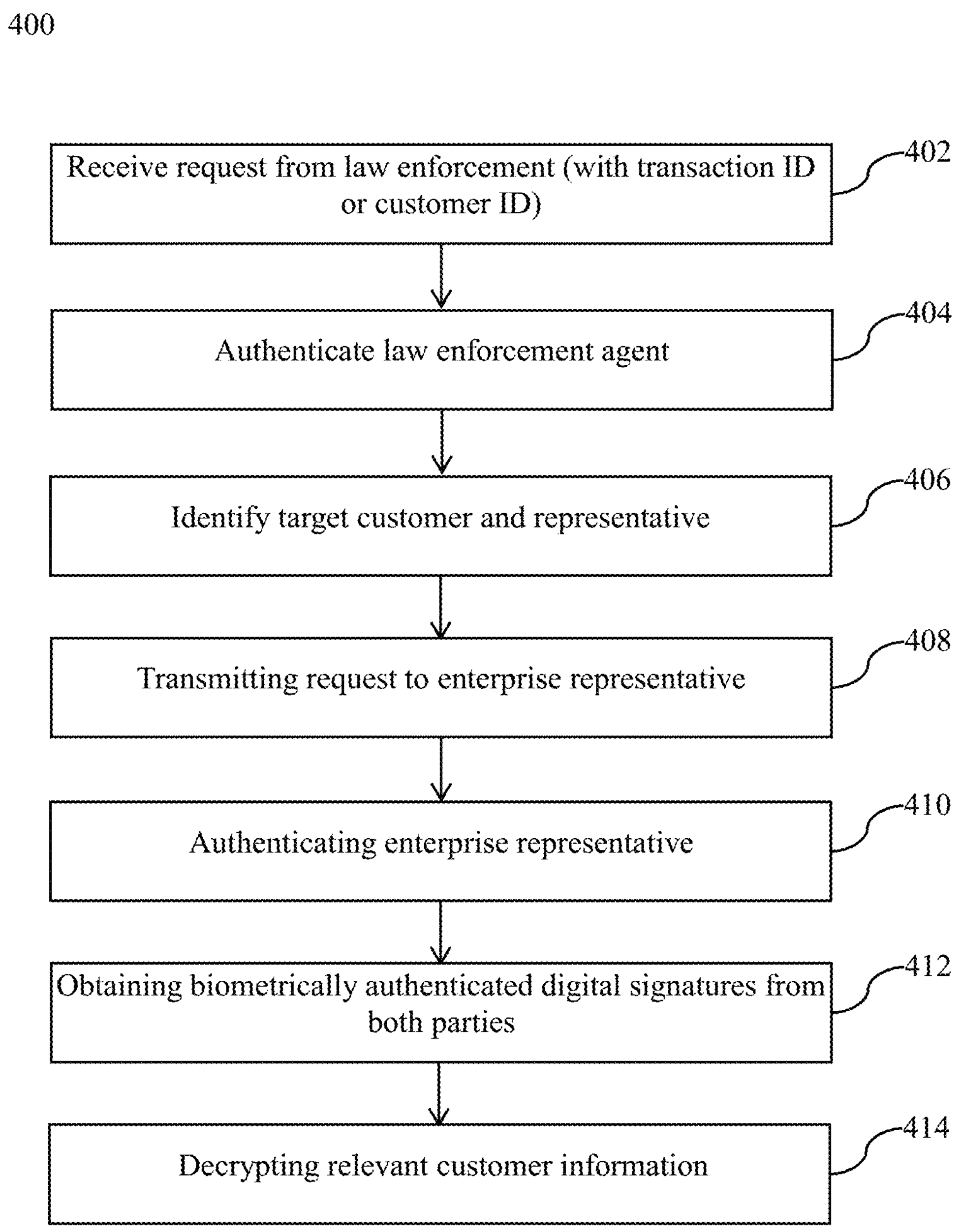
FIG. 4 illustrates a method 400 for processing an information disclosure request, in accordance with an embodiment of the present disclosure.

FIG. 4 illustrates a method 400 for processing an information disclosure request, in accordance with an embodiment of the present disclosure.

At step 402, the method involves receiving a request from law enforcement. This request is received through the law-enforcement application, along with either a corresponding transaction identifier (if the law enforcement agent has not identified the enterprise customer under investigation) or a corresponding tokenized enterprise customer identifier (if the law enforcement agent has identified the enterprise customer under investigation).

At step 404, the method involves authenticating the law enforcement agent's identity based on a user authentication process.

At step 406, the method involves identifying a target tokenized enterprise customer and a target enterprise representative corresponding to the transaction identifier listed in the information disclosure request.

At step 408, the method involves transmitting the information disclosure request to the target enterprise representative.

At step 410, the method involves authenticating the target enterprise representative's identity based on the user authentication process.

At step 412, the method involves obtaining biometrically authenticated digital signatures from both parties. This includes affixing the target enterprise representative's signature as a first signature to the information disclosure request, transmitting the signed request back to the law enforcement agent along with a second signature request, and then affixing the law enforcement agent's signature as a second signature to the request.

At step 414, the method involves decrypting the relevant encrypted enterprise customer identification information.

Figure 5:
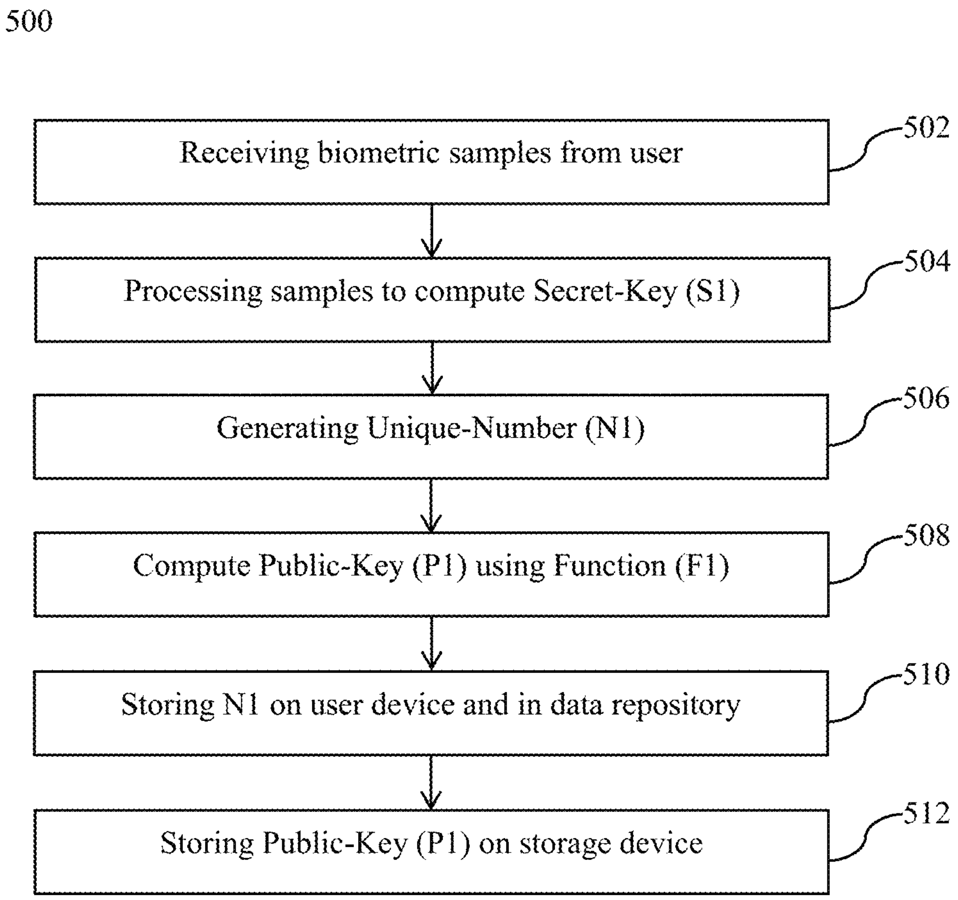
FIG. 5 illustrates a method 500 for user registration, in accordance with an embodiment of the present disclosure.

FIG. 5 illustrates a method 500 for user registration, in accordance with an embodiment of the present disclosure.

At step 502, the method involves receiving a set of biometric samples from the user.

At step 504, the method involves processing the biometric samples to compute a Secret-Key (S1).

At step 506, the method involves generating a Unique-Number (N1) using a random number generation algorithm.

At step 508, the method involves applying a Function (F1) to the Secret-Key (S1) and the Unique-Number (N1) to compute a Public-Key (P1). The Function (F1) is based on Asymmetric Key Encryption.

At step 510, the method involves storing the Unique-Number (N1) on the user device and in a data repository.

At step 512, the method involves storing the Public-Key (P1) on a storage device.

Figure 6:
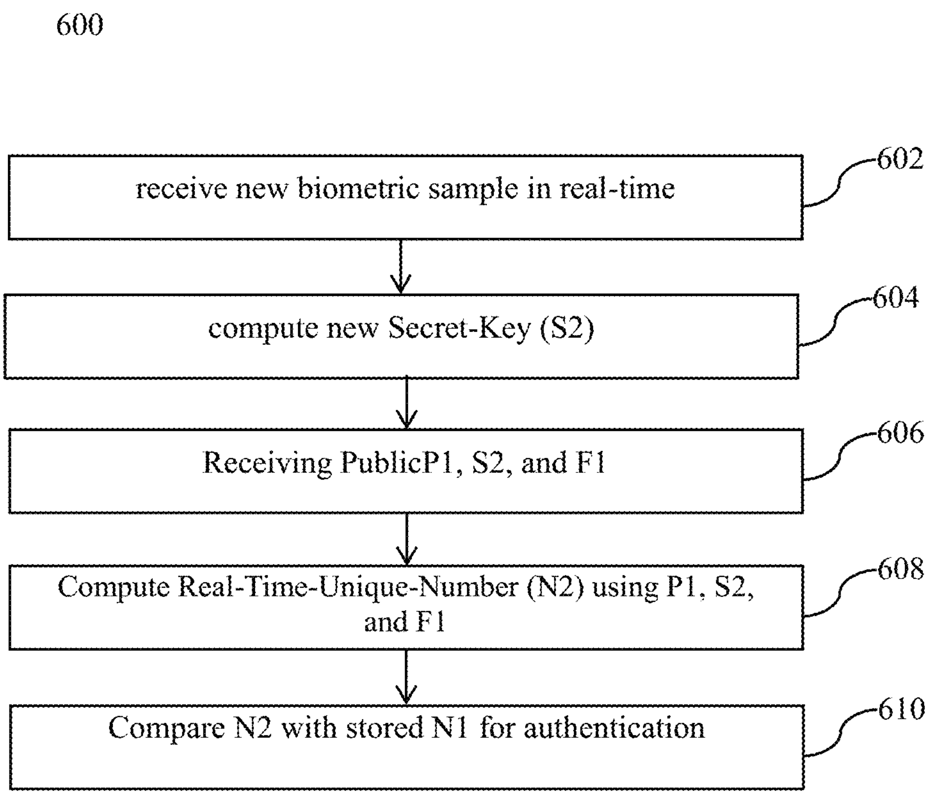
FIG. 6 illustrates a method 600 for user authentication, in accordance with an embodiment of the present disclosure.

FIG. 6 illustrates a method 600 for user authentication, in accordance with an embodiment of the present disclosure.

At step 602, the method involves receiving a real-time biometric sample from the user.

At step 604, the method involves processing the real-time biometric sample to generate a new Secret-Key (S2) for authenticating the user.

At step 606, the method involves fetching the Public-Key (P1), corresponding to the user, from the user device.

At step 608, the method involves computing a Real-Time-Unique-Number (N2) using Public-Key (P1), Secret-Key (S2), and the Function (F1).

At step 610, the method involves comparing the Real-Time-Unique-Number (N2) with the stored Unique-Number (N1) to authenticate the user.

Figure 7:
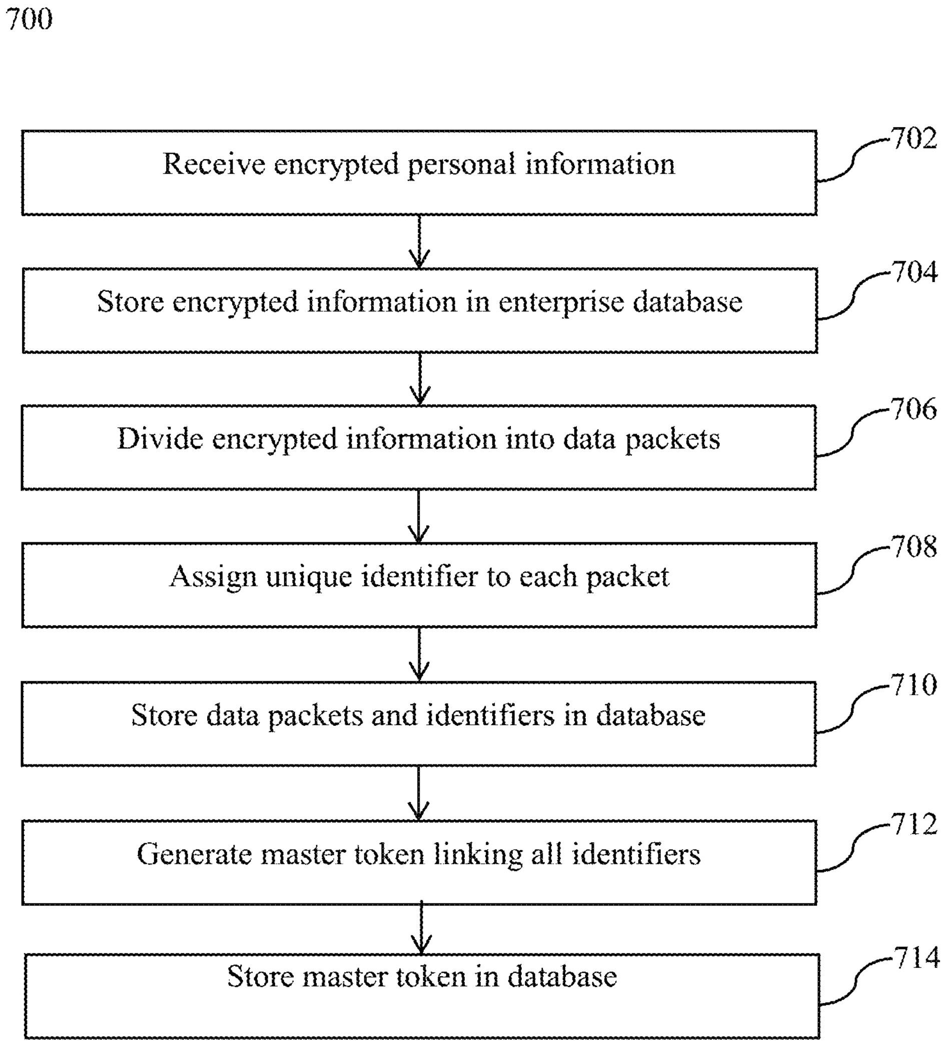
FIG. 7 illustrates a method 700 for tokenizing personal identification information, in accordance with an embodiment of the present disclosure.

FIG. 7 illustrates a method 700 for tokenizing personal identification information, in accordance with an embodiment of the present disclosure.

At step 702, the method involves receiving encrypted personal identification information for an enterprise customer.

At step 704, the method involves storing the encrypted personal identification information in an enterprise database.

At step 706, the method involves dividing the encrypted information into data packets.

At step 708, the method involves assigning a unique identifier to each data packet.

At step 710, the method involves storing the data packets and their corresponding unique identifiers in the enterprise database.

At step 712, the method involves generating a master token that links all the unique identifiers corresponding to the enterprise customer.

At step 714, the method involves storing the master token in the enterprise database.

Figure 8:
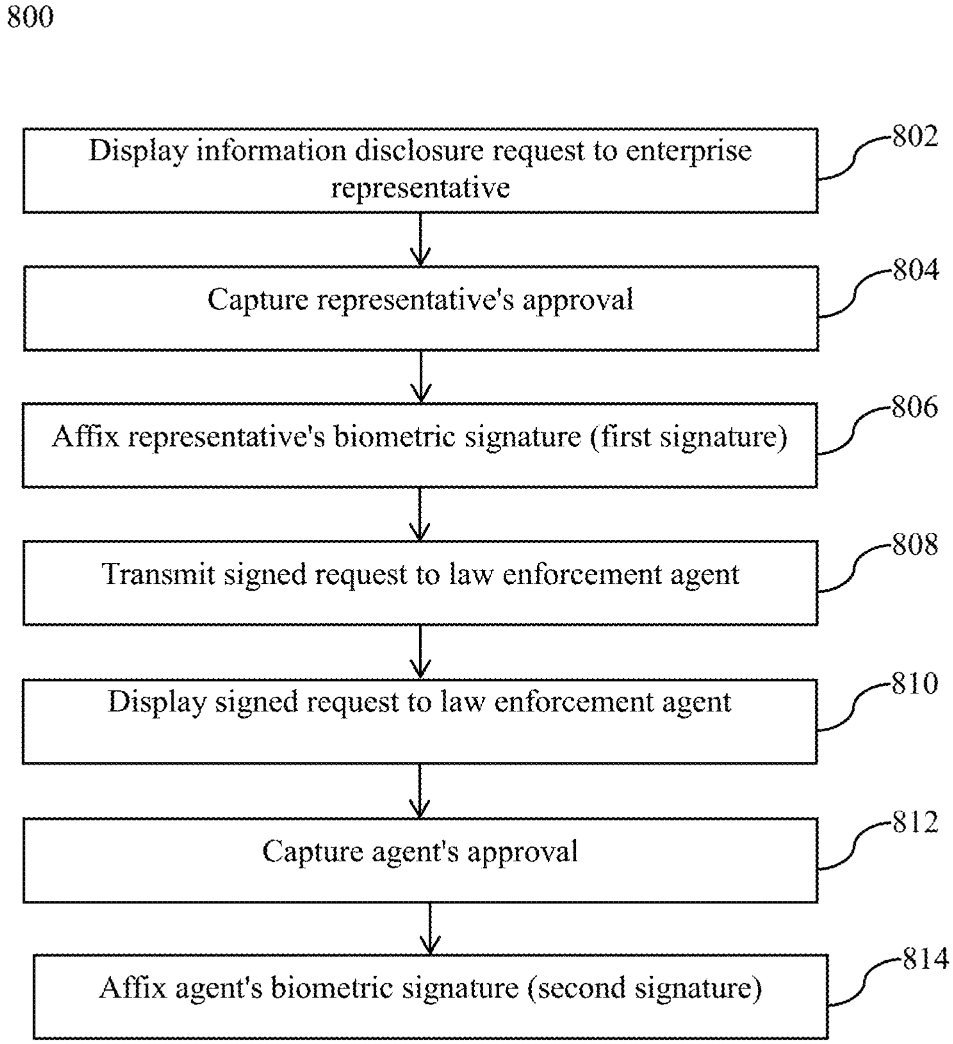
FIG. 8 illustrates a method 800 for handling biometrically authenticated digital signatures in the information disclosure process, in accordance with an embodiment of the present disclosure.

FIG. 8 illustrates a method 800 for handling biometrically authenticated digital signatures in the information disclosure process, in accordance with an embodiment of the present disclosure.

At step 802, the method involves displaying the information disclosure request to the target enterprise representative.

At step 804, the method involves capturing the enterprise representative's approval to sign the information disclosure request.

At step 806, the method involves affixing the target enterprise representative's biometrically authenticated digital signature as the first signature to the information disclosure request.

At step 808, the method involves transmitting the signed information disclosure request back to the law enforcement agent.

At step 810, the method involves displaying the signed information disclosure request to the law enforcement agent.

At step 812, the method involves capturing the law enforcement agent's approval to countersign the signed information disclosure request.

At step 814, the method involves affixing the law enforcement agent's biometrically authenticated digital signature as the second signature to the information disclosure request.

Figure 9:
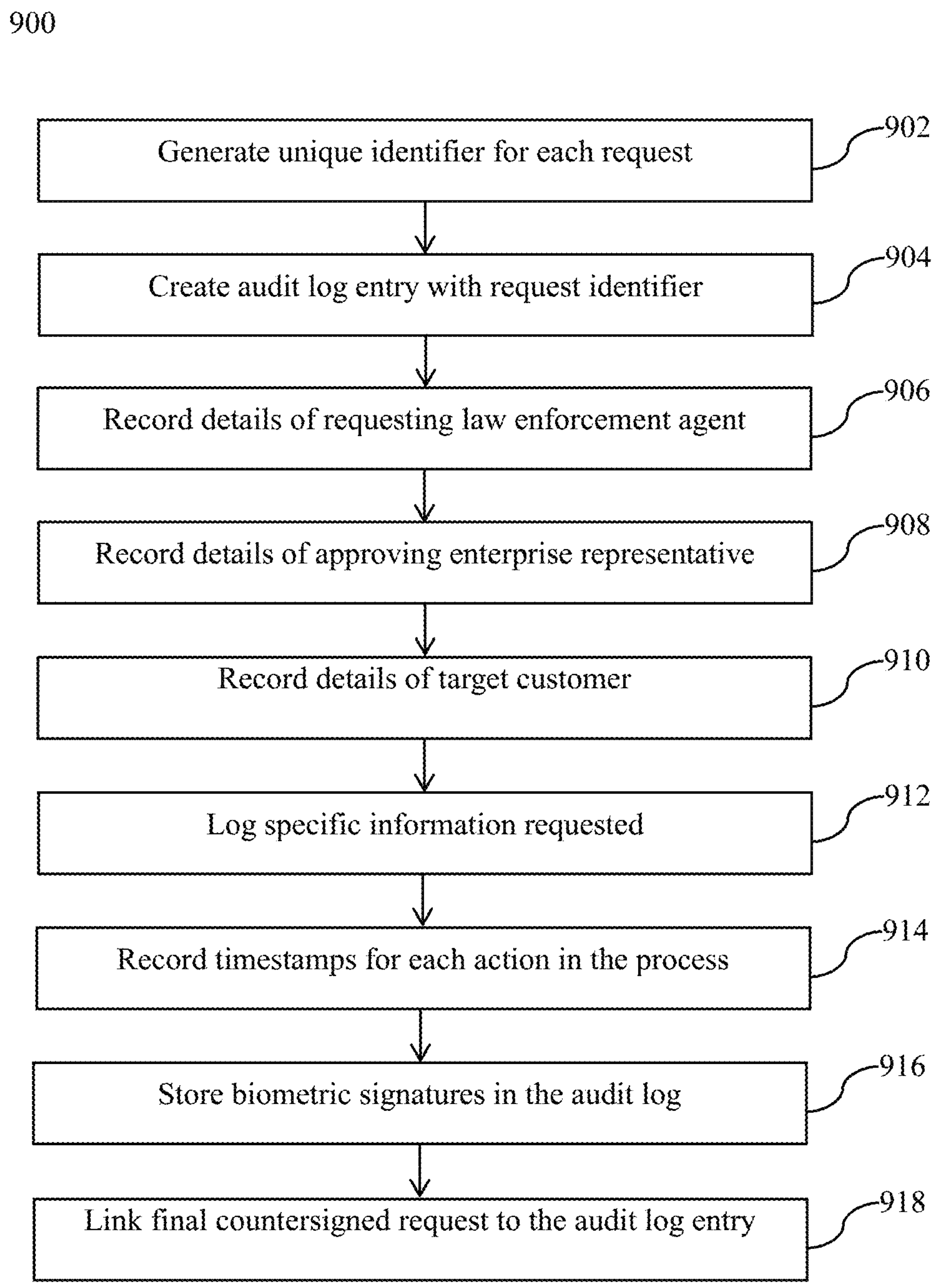
FIG. 9 illustrates a method 900 for maintaining an audit log of information disclosure requests, in accordance with an embodiment of the present disclosure.

FIG. 9 illustrates a method 900 for maintaining an audit log of information disclosure requests, in accordance with an embodiment of the present disclosure.

At step 902, the method involves generating a unique identifier for the information disclosure request.

At step 904, the method involves creating an audit log entry associated with the unique identifier.

At step 906, the method involves recording details of the requesting law enforcement agent in the audit log.

At step 908, the method involves recording details of the approving enterprise representative in the audit log.

At step 910, the method involves recording details of the target customer in the audit log.

At step 912, the method involves recording the specific information requested in the audit log.

At step 914, the method involves recording timestamps for each action in the process.

At step 916, the method involves storing the biometrically authenticated digital signatures for both the target enterprise representative and law enforcement agent in the audit log.

At step 918, the method involves linking the final countersigned information disclosure request to the audit log entry.

Although implementations for the system 101 and the method 300 for managing tokenized personally identifiable information, have been described in language specific to structural features and methods, it must be understood that the claims are not limited to the specific features or methods described. Rather, the specific features and methods are disclosed as examples of implementations for the system 101 and the method 300 for managing tokenized personally identifiable information.

The invention claimed is:

1. A system for managing tokenized personally identifiable information, comprising:

a processor; and a memory coupled to the processor, wherein the processor is configured to execute instructions stored in the memory for:

registering users on an authenticator application, based on a user registration process, including:

registering a first user as an enterprise representative, registering a second user as an enterprise customer, and registering a third user as a law enforcement agent;

wherein for each registered user:

capturing authenticated personal identification information from an External Identity System, encrypting the authenticated personal identification information, and storing the encrypted personal identification information on the user's device;

wherein for the second user:

storing the encrypted personal identification information in an enterprise database, tokenizing the encrypted personal identification information by:

dividing the encrypted personal identification information into data packets, assigning a unique identifier to each packet, storing the data packets and the unique identifiers in the enterprise database, and generating a master token linking all the unique identifiers corresponding to the second user, storing the master token in the enterprise database;

registering users on applications:

registering the first user on an enterprise application as the enterprise representative, registering the second user on the enterprise application as the enterprise customer, and registering the third user as the law enforcement agent on a law enforcement application;

processing an information disclosure request by:

receiving, through the law enforcement application, the information disclosure request and the corresponding transaction identifier, when the law enforcement agent has not identified an enterprise customer under investigation;

receiving, through the law enforcement application, the information disclosure request and the corresponding tokenized enterprise customer identifier, when the law enforcement agent has identified the enterprise customer under investigation;

authenticating the law enforcement agent's identity based on a user authentication process, identifying a target tokenized enterprise customer and a target enterprise representative corresponding to the transaction identifier listed in the information disclosure request, transmitting the information disclosure request to the target enterprise representative, authenticating the target enterprise representative's identity based on the user authentication process, affixing the target enterprise representative's biometrically authenticated digital signature, as a first signature, to the information disclosure request, transmitting the information disclosure request signed by the enterprise representative back to the law enforcement agent along with a second signature request, affixing the law enforcement agent's biometrically authenticated digital signature, as a second signature, to the information disclosure request, and decrypting the relevant encrypted enterprise customer identification information; and maintaining an audit log of all information disclosure requests along with the first signature and the second signature.

2. The system of claim 1, wherein the user registration process comprises:

receiving a set of biometric samples of the user;

processing the biometric samples to compute a Secret-Key (S1);

generating a Unique-Number (N1) using a random number generation algorithm;

applying a Function (F1) to the Secret-Key (S1) and the Unique-Number (N1) to compute a Public-Key (P1), wherein the Function (F1) is based on Asymmetric Key Encryption;

storing the Unique-Number (N1) on the user device and in a data repository; and storing the Public-Key (P1) on a storage device.

3. The system of claim 1, wherein the user authentication process comprises:

receiving a real-time biometric sample from the user;

processing the sample to generate a Secret-Key (S2);

fetching the Public-Key (P1) from the user device;

computing a Real-Time-Unique-Number (N2) using P1, S2, and F1; and authenticating the user by comparing N2 with the stored N1.

4. The system of claim 1, wherein the step of capturing authenticated personal information comprises:

receiving a user request to add information from the External Identity System;

connecting with the External Identity System;

authenticating the user with the External Identity System;

receiving encrypted and authenticated personal identification information; and storing the encrypted and authenticated personal identification information on the user's device and, for the second user, in the enterprise database.

5. The system of claim 1 is further configured for enrolling the enterprise representative by:

verifying the enterprise representative's email address associated with the official domain name owned by the enterprise.

6. The system of claim 1, wherein identifying the target tokenized enterprise customer and a target enterprise representative corresponding to the transaction identifier listed in the information disclosure request, comprises:

identifying relevant data packets based on the request; and retrieving identified packets using the master token and identifiers.

7. The system of claim 1 is further configured for applying user authentication at each step of the information disclosure request process.

8. The system of claim 1, wherein the audit log includes:

identifier of the law enforcement agent;

identifier of the enterprise representative; and identifier of the target enterprise customer.

9. The system of claim 1, wherein the enterprise database stores only encrypted information and the associated tokens, with no ability to decrypt without the law-enforcement agent's private key.

10. The system of claim 1, wherein interacting with the External Identity System comprises:
establishing a secure connection with the External Identity System;
verifying the authenticity of the External Identity System;
sending encrypted user credentials to the External Identity System;
receiving encrypted authenticated personal information from the External Identity System.

11. The system of claim 1, wherein the information disclosure request related to a transaction under investigation includes:
the identification information corresponding to the enterprise customer who is a party to a specific transaction in question; and
a legal basis for the request.

12. The system of claim 1, wherein the law enforcement application provides features for:
securely submitting information disclosure requests;
tracking the status of submitted requests;
securely receiving and decrypting disclosed information; and
maintaining an internal audit log of all actions taken within the application.

13. The system of claim 1, wherein encryption of personal identification information uses industry-standard encryption algorithms.

14. The system of claim 1 is further configured for managing user consent and notification by:
obtaining, during the registration process, user consent for data collection and potential disclosure.

15. The system of claim 1, wherein affixing signatures from both the target enterprise representative and the law enforcement agent comprises:
initiating the authentication process for the target enterprise representative based on the user authentication process;
upon successful authentication, displaying the information disclosure request to the target enterprise representative;
capturing the enterprise representative's approval to sign the information disclosure request;
affixing the target enterprise representative's biometrically authenticated digital signature to the information disclosure request as the first signature;
initiating the authentication process for the law enforcement agent;
upon successful authentication based on the user authentication process, displaying to the law-enforcement agent the information disclosure request with the first signature affixed;
capturing the law enforcement agent's approval to countersign the signed information disclosure request;
affixing the law enforcement agent's biometrically authenticated digital signature to the information disclosure request as the second signature.

16. The system of claim 15 is further configured for:
generating a unique identifier for the information disclosure request;
creating the audit log associated with the unique identifier;
recording timestamps for each step of the signature process in the audit log;
storing the biometrically authenticated digital signatures for both the target enterprise representative and law enforcement agent in the audit log; and
linking the final countersigned information disclosure request to the audit log.

17. A method for managing tokenized personally identifiable information, comprising:
registering users on an authenticator application, based on a user registration process, including:
registering a first user as an enterprise representative, registering a second user as an enterprise customer, and registering a third user as a law enforcement agent;
wherein for each registered user:
capturing authenticated personal identification information from an External Identity System,
encrypting the authenticated personal identification information, and
storing the encrypted personal identification information on the user's device;
wherein for the second user:
storing the encrypted personal identification information in an enterprise database,
tokenizing the encrypted personal identification information by:
dividing the encrypted personal identification information into data packets,
assigning a unique identifier to each packet,
storing the data packets and the unique identifiers in the enterprise database, and
generating a master token linking all the unique identifiers corresponding to the second user,
storing the master token in the enterprise database;
registering users on applications:
registering the first user on an enterprise application as the enterprise representative,
registering the second user on the enterprise application as the enterprise customer, and
registering the third user as the law enforcement agent on a law enforcement application;
processing an information disclosure request by:
receiving, through the law enforcement application, the information disclosure request and the corresponding transaction identifier, when the law enforcement agent has not identified an enterprise customer under investigation;
receiving, through the law enforcement application, the information disclosure request and the corresponding tokenized enterprise customer identifier, when the law enforcement agent has identified the enterprise customer under investigation;
authenticating the law enforcement agent's identity based on a user authentication process,
identifying a target tokenized enterprise customer and a target enterprise representative corresponding to the transaction identifier listed in the information disclosure request,
transmitting the information disclosure request to the target enterprise representative,
authenticating the target enterprise representative's identity based on the user authentication process,
affixing the target enterprise representative's biometrically authenticated digital signature, as a first signature, to the information disclosure request,
transmitting the information disclosure request signed by the enterprise representative back to the law enforcement agent along with a second signature request, affixing the law enforcement agent's biometrically authenticated digital signature, as a second signature, to the information disclosure request, and decrypting the relevant encrypted enterprise customer identification information; and maintaining an audit log of all information disclosure requests along with the first signature and the second signature.

18. A non-transitory computer-readable storage medium storing computer program instructions which, when executed by a processor, cause the processor to perform operations for managing tokenized personally identifiable information, the operations comprising:

registering users on an authenticator application, based on a user registration process, including:

registering a first user as an enterprise representative, registering a second user as an enterprise customer, and registering a third user as a law enforcement agent;

wherein for each registered user:

capturing authenticated personal identification information from an External Identity System, encrypting the authenticated personal identification information, and storing the encrypted personal identification information on the user's device;

wherein for the second user:

storing the encrypted personal identification information in an enterprise database, tokenizing the encrypted personal identification information by:

dividing the encrypted personal identification information into data packets, assigning a unique identifier to each packet, storing the data packets and the unique identifiers in the enterprise database, and generating a master token linking all the unique identifiers corresponding to the second user, storing the master token in the enterprise database;

registering users on applications:

registering the first user on an enterprise application as the enterprise representative, registering the second user on the enterprise application as the enterprise customer, and registering the third user as the law enforcement agent on a law enforcement application;

processing an information disclosure request by:

receiving, through the law enforcement application, the information disclosure request and the corresponding transaction identifier, when the law enforcement agent has not identified an enterprise customer under investigation;

receiving, through the law enforcement application, the information disclosure request and the corresponding tokenized enterprise customer identifier, when the law enforcement agent has identified the enterprise customer under investigation;

authenticating the law enforcement agent's identity based on a user authentication process, identifying a target tokenized enterprise customer and a target enterprise representative corresponding to the transaction identifier listed in the information disclosure request, transmitting the information disclosure request to the target enterprise representative, authenticating the target enterprise representative's identity based on the user authentication process, affixing the target enterprise representative's biometrically authenticated digital signature, as a first signature, to the information disclosure request, transmitting the information disclosure request signed by the enterprise representative back to the law enforcement agent along with a second signature request, affixing the law enforcement agent's biometrically authenticated digital signature, as a second signature, to the information disclosure request, and decrypting the relevant encrypted enterprise customer identification information; and maintaining an audit log of all information disclosure requests along with the first signature and the second signature.

* * * * *